(12) United States Patent
Goehring

(10) Patent No.: US 7,685,966 B2
(45) Date of Patent: Mar. 30, 2010

(54) LIDDED PET DISH

(76) Inventor: Heidi L. Goehring, 502 Rushmore La., Madison, WI (US) 53711

( * ) Notice: Subject to any disclaimer, the term of this patent is extended or adjusted under 35 U.S.C. 154(b) by 27 days.

(21) Appl. No.: 11/934,109

(22) Filed: Nov. 2, 2007

(65) Prior Publication Data
US 2008/0105205 A1 May 8, 2008

Related U.S. Application Data

(60) Provisional application No. 60/864,199, filed on Nov. 3, 2006.

(51) Int. Cl.
*A01K 5/02* (2006.01)
(52) U.S. Cl. .................... 119/51.02; 119/61.5
(58) Field of Classification Search .............. 119/51.01, 119/51.02, 61.5, 51.12, 702; 49/30; 40/300, 40/301
See application file for complete search history.

(56) References Cited

U.S. PATENT DOCUMENTS

| | | | | |
|---|---|---|---|---|
| 3,532,075 A * | 10/1970 | Cooper | | 119/51.12 |
| 4,473,031 A * | 9/1984 | Bobeczko | | 119/51.12 |
| 5,088,447 A * | 2/1992 | Spencer et al. | | 119/51.02 |
| 5,669,328 A * | 9/1997 | Lanfranchi | | 119/57.92 |
| 6,349,671 B1 * | 2/2002 | Lewis et al. | | 119/51.02 |
| 6,446,574 B2 * | 9/2002 | Bickley | | 119/55 |
| 7,073,461 B2 * | 7/2006 | Gonet | | 119/61.5 |
| 7,124,707 B1 * | 10/2006 | Clarke | | 119/51.02 |
| 7,159,539 B2 * | 1/2007 | Neckel | | 119/51.02 |
| 7,342,368 B2 * | 3/2008 | Roman | | 318/285 |
| 7,395,782 B1 * | 7/2008 | Lindsay | | 119/51.02 |
| 2002/0134313 A1 * | 9/2002 | King et al. | | 119/51.02 |
| 2007/0125306 A1 * | 6/2007 | Beecher | | 119/51.02 |

* cited by examiner

*Primary Examiner*—Rob Swiatek
*Assistant Examiner*—Danielle Bates
(74) *Attorney, Agent, or Firm*—Joseph S. Heino; Patrick M. Bergin

(57) ABSTRACT

A lidded pet food dish uses wireless technology to independently and selectively open one of a plurality of lidded food compartments for access by a pet. The dish discriminates between pets by means of a tag worn by each pet to allow or prevent access to a given food compartment. Electronic circuitry for this functionality is operable by any wireless technology and provides for manual system override by the pet owner as well as remote control capability.

15 Claims, 5 Drawing Sheets

LIDDED PET DISH

This application claims the priority and benefit of U.S. Provisional Patent Application Ser. No. 60/864,199 filed Nov. 3, 2006.

FIELD OF THE INVENTION

The present invention relates generally to the field of pets and devices that are used to feed pets. More particularly, it relates to a lidded pet dish that uses wireless technology to control selective access to the dish by multiple pets.

BACKGROUND OF THE INVENTION

In the area of data acquisition, the use of wireless communication devices is well known. For example, infrared (IR) technology and radio frequency identification (RFID) technology, in particular, are well known in the art of wireless communication devices and in the art of electronic identification methods.

RFID technology relies on the storage and remote retrieval of data by means of one or more transmission or transponder devices that are frequently called RFID "tags." An RFID tag is a small electronic device that can be attached to or incorporated within a physical item or object for a number of different purposes. RFID tags contain micro-circuitry and antennas that enable them to receive and respond to radio frequency queries from an RFID transceiver. Passive tags require no internal power source, whereas active tags typically require a power source.

IR technology refers to the use of free-space propagation of light waves in the near infrared band as a transmission medium for communication. IR technology has advantages over RFID technology in that IR systems are generally cheaper to produce than wireless RFID links. Using IR technology, a point-to-point connection between two devices may be constructed for very low cost, with one or two emitter light-emitting diodes (LEDs). Additionally, numerous modulation methods have been developed for transmitting data using infrared signals. Modulation methods that are currently in commercial use include baseband pulsing, frequency shift keying, amplitude shift keying, phase shift keying, pulse position modulation and burst-pulse position modulation. Each of these modulation methods involves tradeoffs between cost, signal distance, signal rate and "ambient immunity". Ambient immunity is the ability to receive information sent over infrared signals while rejecting ambient sources of light. Ambient sources of light include, for example, sunlight, fluorescent lighting and incandescent lighting.

The use of containers or dishes for feeding and watering pets is also well known. Such dishes can be used to provide a pet, or several of them, with a quantity of pet food and water. In the situation where only one pet has access to the contents of such a dish, the pet owner clearly has control over how much food is consumed by his or her pet and when that food is made available to the pet. However, in a multiple pet household, or in an animal care facility where multiple pets can be found, the control over how much food is consumed by any one pet is subject to far less accurate assessment. That is, in a multiple-pet setting, one pet may be consuming more than its "fair share" of food, thus shorting other pets of their food requirements. This problem is even more evident in a situation where, for example, a household is inhabited by a dog and a cat where the dog has access to the cat's food. In that situation, it has been observed by this inventor that dogs seem to prefer cat food which tends to be more expensive. Not only does this often result in the cat going hungry, it also results in each pet getting an incorrect diet. This situation is made worse where, for example, one pet requires that some sort of medication be added to its food and diet. In that situation, the wrong pet may be medicated and the pet that was intended to be medicated is denied its proper level of medication. While the obvious solution to these situations would be to separate the pets, such is not always easy for the pet owner to do and may have no effect since some pets, when separated, will not eat.

Another undesirable consequence of leaving pet food dishes unmonitored is that other "eaters" may, from time to time, attempt to access the pet food dishes. For example, curious infants are known to attempt to gain access the contents of pet food dishes, as will hungry rodents and pesky insects, assuming that the food dish is in such an area that it can be accessed in that fashion.

In the view of this inventor, there is a need to devise a lidded pet food dish that allows selective access to the dish contents by the particular intended pet or pets and that denies access to all other pets and other eaters.

SUMMARY OF THE INVENTION

Accordingly, it is an object of the present invention to provide a lidded pet food dish that allows selective access to the dish contents by one or more pets. It is another object of the present invention to provide such a lidded pet food dish whereby multiple pets may use the dish in such a way that only the food dish compartment assigned to a particular pet is accessed by that pet, and only that pet, all others being unable to access that compartment. It is still another object of the present invention to provide such a lidded pet food dish that uses currently available wireless technology to accomplish this selective accessing of the lidded pet food dish. It is yet another object of the present invention to provide such a lidded pet food dish that also includes an "override" mechanism such that the pet owner will have unfettered access to the contents of the lidded pet food dish when such is desired or required. This override mechanism could be incorporated into a device that would be operated directly on the device or remotely by the pet owner. In this fashion, the owner could check whether a given pet has eaten and, if so, how much that pet has eaten.

The device of the present invention has obtained these objects. It provides for a lidded pet food dish that uses one or more wireless or RFID tags that are associated with a like number of corresponding pets. Each pet that is fitted with an RFID tag has the ability or means to access the contents of at least one compartment of the lidded pet food dish such that the pet will have exclusive access to that compartment. The pet food dish of the present invention has at least one food compartment and a hinged lid for that compartment, the lid being movable between an open position and a closed position. The dish has a sensor in it that receives a passive or active signal from the pet's RFID tag for actuating the opening of the compartment lid. As that pet approaches the lidded pet food dish, and comes within a pre-determined distance of the dish, that pet's lidded dish compartment is made accessible by the opening of the lid. As the animal leaves the dish, the lid would close. No other pet would be able to actuate the opening of the lid of that particular compartment. The lidded food dish also has an override mechanism that allows the pet owner to open the lid of each compartment to check on the amount of food consumed and to refill the compartment as needed.

The foregoing and other advantages of the device of the present invention will be further apparent from the detailed description that follows.

DETAILED DESCRIPTION

Figure 1:
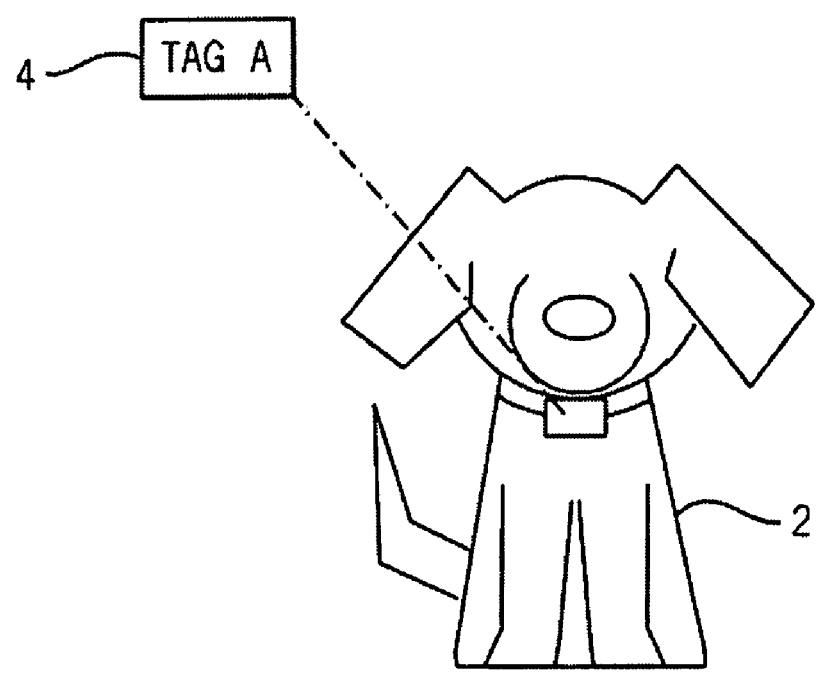
FIG. 1 is a schematic diagram illustrating the outfitting of a first pet with a passive RFID tag in accordance with the present invention, the first pet being a dog.
Figure 2:
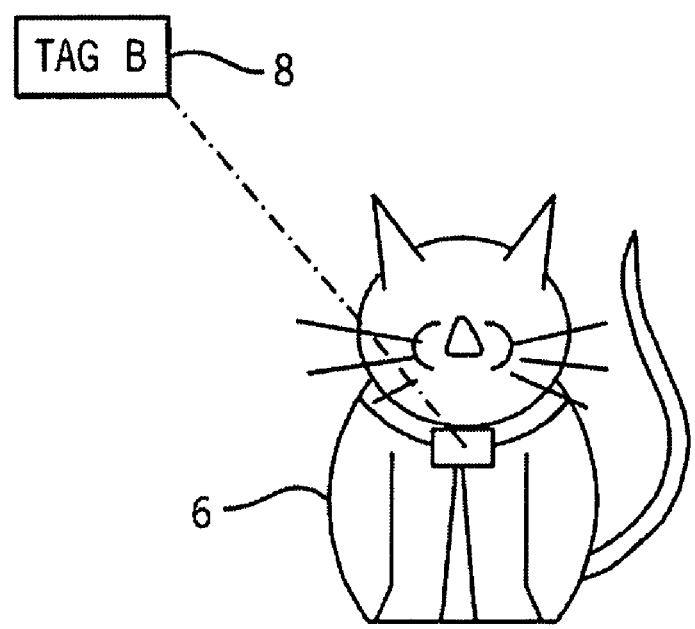
FIG. 2 is a schematic diagram illustrating the outfitting of a second pet with a passive RFID tag in accordance with the present invention, the second pet being a cat.

Referring now to the drawings in detail, wherein like numbered elements refer to like elements throughout, FIGS. 1 and 2 illustrate, in schematic form, two pets with which the device of the present invention could be used. It is to be understood that, although only two pets are shown, the device of the present invention is not limited to the two-pet application. That is, any number of pets could use the device of the present invention. As shown, the first pet is a dog 2 that is outfitted with a passive RFID tag 4, also identified as "TAG A," that is attached to its collar. The second pet is a cat 6 that is outfitted with a similar passive RFID tag 8 that is identified as "TAG B." It is to be understood that the passive RFID tags 4, 8 each carries with it certain identifying information and are each "readable" by a sensor in accordance with a pre-programmed scheme as will be apparent later in this detailed description. Each RFID tag 4, 8, however, is readable in the same fashion, even though each contains different tag information. That is, it is to be understood that the passive RFID tags 4, 8 could also be configured as active RFID tags, as infrared tags, or other type of tag that utilizes wireless information technology that has been used or which has yet to be used. The important purpose of the RFID tags 4, 8 is to differentiate the access information carried by one pet from the information that is carried by the other pet or pets. It is also possible to "embed" other pertinent pet information into each tag 4, 8 for the purpose of gaining recordable information and data about feeding times, feeding amounts, etc. that could be captured by a random access memory or flash memory component within the basic circuit disclosed later in this detailed description. Physically, the tags 4, 8 could be configured to include a clear vinyl pocket (not shown) to include, other pet-specific information, such as the owner's name and address and the pet's name, for example.

As alluded to previously, it is also to be understood that infrared (IR) data transmission could be employed in an alternative embodiment of the tags 4, 8 mentioned above. In the case of IR data transmission, IR light-emitting diodes can be used to emit or transmit IR radiation which is focused by a plastic lens into a narrow beam or "cone." The beam is modulated, or switched "on" and "off" very quickly, to encode the data. The receiver, in turn, uses a photodiode to convert the received IR radiation into an electric current. The receiver is typically designed such that it responds only to the rapidly pulsing signal created by the transmitter, and filters out slowly changing IR radiation from other ambient light or heat sources. IR is a "line-of-sight" transmission method because it does not penetrate most objects, such as walls, and accordingly does not interfere with other devices in adjoining rooms. The communication that actually occurs between two devices that operate on IR principles only "simulate" duplex communication because they quickly turn the link between the two devices around.

Figure 3:
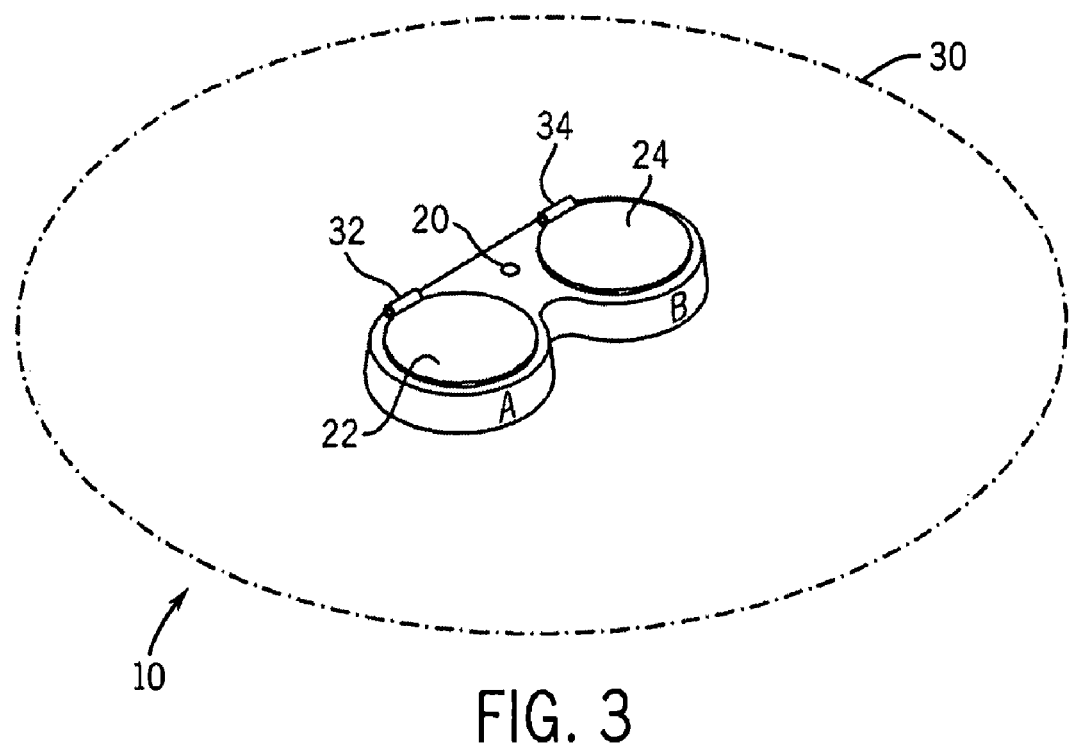
FIG. 3 is a schematic diagram illustrating a lidded pet food dish in accordance with the present invention.
Figure 4:
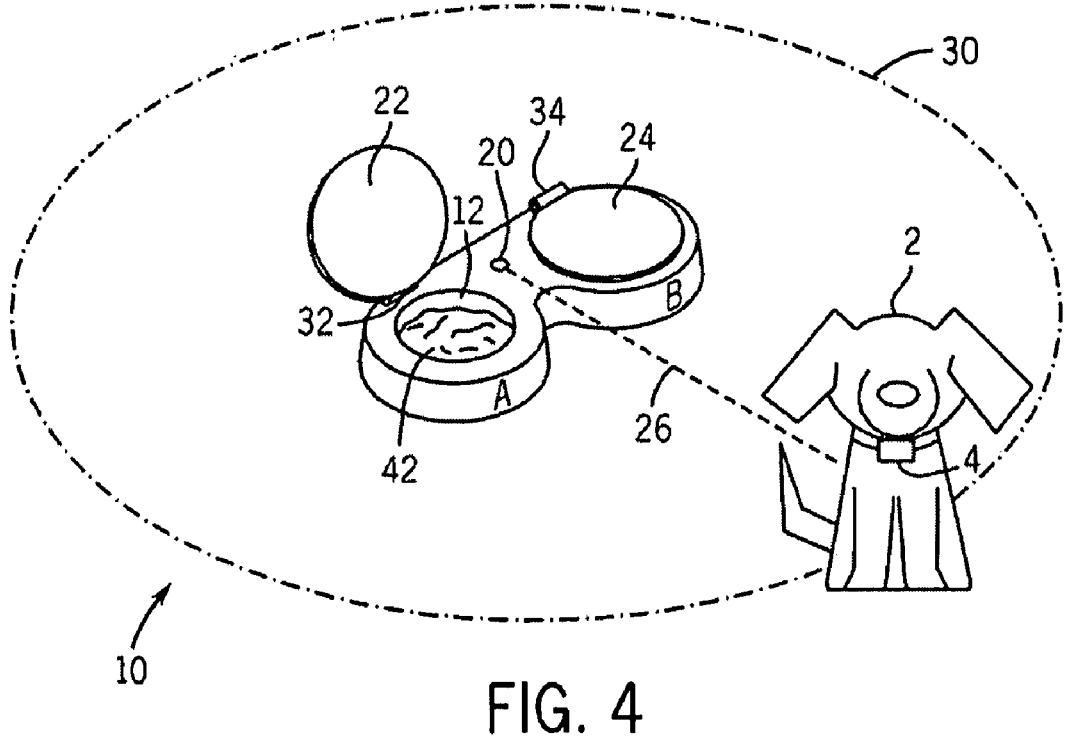
FIG. 4 is a schematic diagram illustrating the lidded pet food dish where the first pet approaches the dish.
Figure 5:
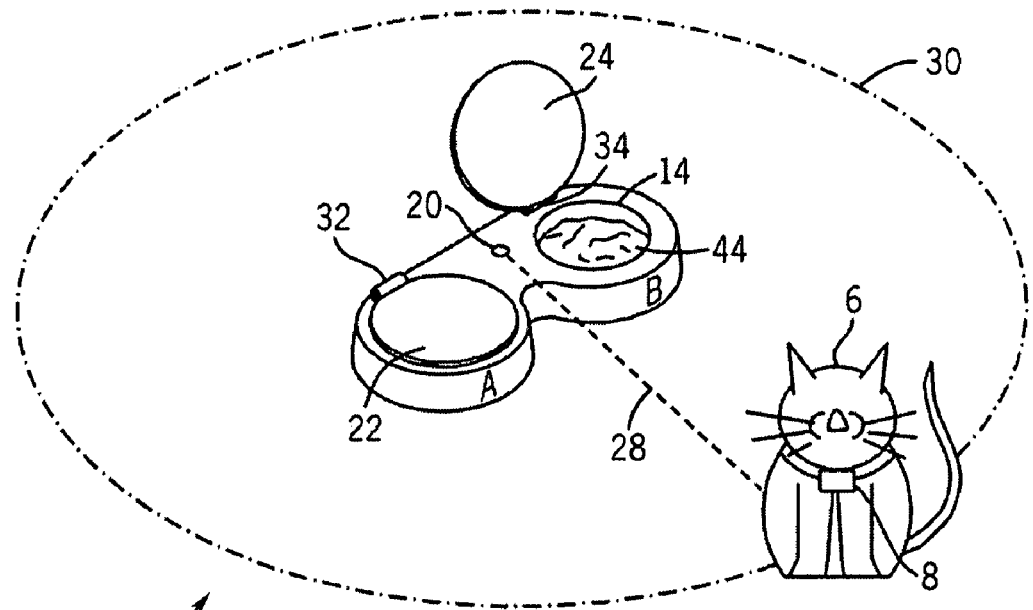
FIG. 5 is a schematic diagram illustrating the lidded pet food dish where the second pet approaches the dish.
Figure 6:
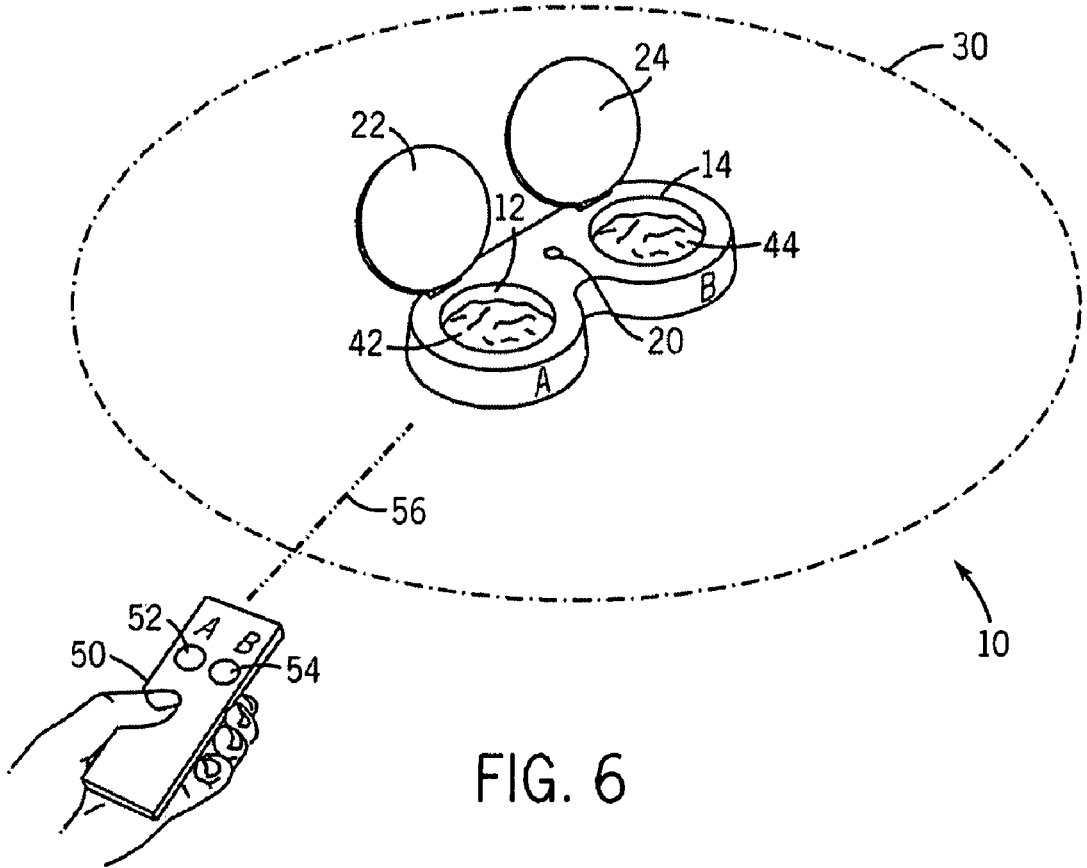
FIG. 6 is a schematic diagram illustrating the lidded pet food dish with a remotely-controlled override mechanism as used by the pet owner.

Referring now to FIG. 3, it illustrates a lidded pet dish, generally identified 10, in one preferred embodiment of the present invention, this particular embodiment using RFID technology. Although the example given here, which example is given solely for the purpose of illustrating enablement of the present invention, is one where the dish 10 includes two compartments 12, 14, the compartments being labeled "A" and "B," it is to be understood that other numbers of compartments could be used within the scope of the present invention. The "A" and "B" nomenclature presented here is provided to distinguish the first compartment 12 from the second compartment 14, much in the same way as the two pets are distinguished. The two individual compartments 12, 14 contained within the dish 10 are best illustrated in FIGS. 4, 5 and 6. It is also to be understood that the compartments 12, 14 could be configured with removable inner dishes or liners (not shown) for ease in filing and cleaning the dish 10. As with the tags, the dish 10 could also be configured to include a clear vinyl pocket (not shown) to include pet-specific information, as well, such as the pet's name, the pet's picture, and the like.

As shown in FIG. 3, it will be seen that each compartment 12, 14 is "lidded." That is, each compartment 12, 14 includes a hinged lid 22, 24 that seats atop each compartment. The lids 22, 24 each include a hinge 32, 34, respectively, which allows the lids 22, 24 to rotate upwardly to the "open" position and downwardly to the "closed" position at the hinge 32, 34 when a power circuit (not shown) is actuated. The power circuit would include a small direct current (DC) power supply that would operate a small DC motor attached to each hinge 32, 34. Such motors are well known in the art. The power supply would most conveniently be comprised of one or more DC batteries that would be housed within the dish 10 as well. The normal position for each lid 22, 24 is in the "down" position as shown in FIG. 3. Although not shown, it is also to be understood that each lid 22, 24 may be fitted with a seal whereby vermin and insects are prevented from accessing the food contents 42, 44, respectively, of each compartment 12, 14 when each lid is in the "down" position. This type of a seal can also assist in odor control relative to the specific food contents 42, 44 fed to the pets. See also FIGS. 4, 5 and 6 in this regard. While the lids 22, 24 are shown hinged from the rear of the dish 10, it is to be understood that the hinges 32, 34 could be located at another part of the peripheral edge of each lid 22, 24 and still come within the scope of the present invention. For example, the lids 22, 24 could be hinged in a "back-to-back" configuration whereby the lids 22, 24 would actually serve as a barrier to each pet 2, 6 during side-by-side feeding. That is, the lid that provides access to one compartment could effectively "block" the other pet from access to that compartment to prevent one pet from "muscling in" on the other pet during feeding. The lids 22, 24 could be alternatively configured to "swing" out of the way during feeding.

Though not shown, it is to be understood that the lids 22, 24 could be color-coded with the respective pet tags 4, 8 used with each of the owner's pets 2, 6. The same color-coding could be used with the compartments 12, 14 as well. This color-coding scheme would assist the pet owner with easy visualization as to which pet is supposed to have access to which compartment 12, 14.

Returning now to the first preferred embodiment, and as is shown in FIG. 3, it will be seen that the dish 10 also includes an electronic device 20 which is a sensor for each of the pet tags 4, 8. The electronic device 20 would be part of the DC electrical circuitry described above. Here again, the wireless technology used could be altered without deviating from the scope of the present invention. In this particular dish 10, however, the electronic device 20, or "sensor," is intended in this first preferred embodiment to operate using RFID technology of the type that is well known in the art. As is also shown in FIGS. 3 through 6, the sensor 20 is functionally adapted to be actuated within a given perimeter 30 about the dish 10. The perimeter 30 is exaggerated in the given illustrations and would, in the preferred embodiment be much closer to the dish 10 than is shown, the perimeter 30 being illustrated for representation purposes only. In the preferred embodiment, the sensor 20 would "sense" a signal 26, 28 that would respond to a pet tag 4, 8, respectively, when the pet 2, 6, approached the dish 10 at a point that is within this perimeter 30.

More specifically, and as is shown in FIG. 4, as the dog 2 would approach the dish 10 and be sensed to be within the perimeter 30 of operation of the dish 10, its tag 4 would trigger a signal 26 from the sensor 20. This would then actuate a motor (not shown) that would move the lid 22 of the "A" compartment 12 upwardly, in response to the presence of the dog 2. This would afford the dog 2 with access to its food 42. Note that the dog 2 would not be afforded access to the food 44 contained within the "B" compartment 14, which is that compartment 14 used by the cat 6. If the dog 2 wanders away from the dish 10, the lid 22 of its food compartment 12 closes and would not re-open unless and until the dog 2 again approached the dish 10.

If the cat 6 approaches the dish 10, a similar action results with respect to the "B" compartment 14. As is shown in FIG. 5, as the cat 6 would approach the dish 10 and be sensed to be within the perimeter 30 of operation, its tag 8 would similarly trigger a signal 28 from the sensor 20. This would then actuate a motor (also not shown) that would move the lid 24 of the "B" compartment 14 upwardly, in response to the presence of the cat 6. This would afford the cat 6 with access to its food 44. Note that the cat 6 would not be afforded access to the food 42 contained within the "A" compartment 12, which is that compartment 12 used by the dog 2. If the cat 6 wanders away from the dish 10, the lid 24 of its food compartment 14 would close and would not re-open unless the cat 6 again approached the dish 10.

It should be obvious to the reader that any number of dishes 10 could be used with an even greater number of pets 2, 6 or that the dish 10 could be configured with an even greater number of compartments 12, 14, each corresponding to an associated pet. The precise number of pets and the precise number of compartments is not a limitation of the present invention.

It is also within the scope of the present invention that the electronic circuitry of the dish 10 be pre-programmed such that, when one lid is in the "open" position as would be intended for the pet that would be feeding from it, the open lid could move to a "closed" position if the other pet approached and attempted to aggressively feed from the wrong compartment. Other pre-programmed variations could also be incorporated within the basic design of the present invention.

One additional aspect of the present invention is that the owner be enabled to check the food or water contents 42, 44 of each compartment 12, 14 when such is desired or required. That is, the owner should have access to each compartment 12, 14 to determine whether the compartment 12, 14 needs to be cleaned and re-filled or to determine whether the pet 2, 6 is eating and at what rate its food is being eaten. One way to provide the owner with access to the compartments 12, 14 would be to provide, as part of the control circuitry, an override button (not shown) that would be located on top of or underneath the dish 10 and in a position where it could not be inadvertently actuated by the feeding pet 2, 6. This would allow the pet owner to remove the dishes for filling, cleaning, and so on, without the need for the owner to wait for pet-actuation of the dish 10. Another way to accomplish this is illustrated in FIG. 6 which shows that the owner would be provided with a remote control device 50, the remote control device 50 being integrated with the circuitry of the sensor 20. The control device 50 could include, for example, actuation buttons 52, 54 whereby the owner could selectively "open" the lids 22, 24, respectively, or either of them, of the dish 10. The control device 50 could also include circuitry such that depressing one of the actuating buttons 52, 54 a first time "opens" a lid 12, 14 and depressing the actuating button 52, 54 a second time "closes" the lid 12, 14. Alternatively, the control circuitry in the dish 10 of the present invention could include a built-in timing capability such that the lid 12, 14 stays open for a pre-programmed period of time and then automatically re-closes the lid 12, 14.

Figure 7:
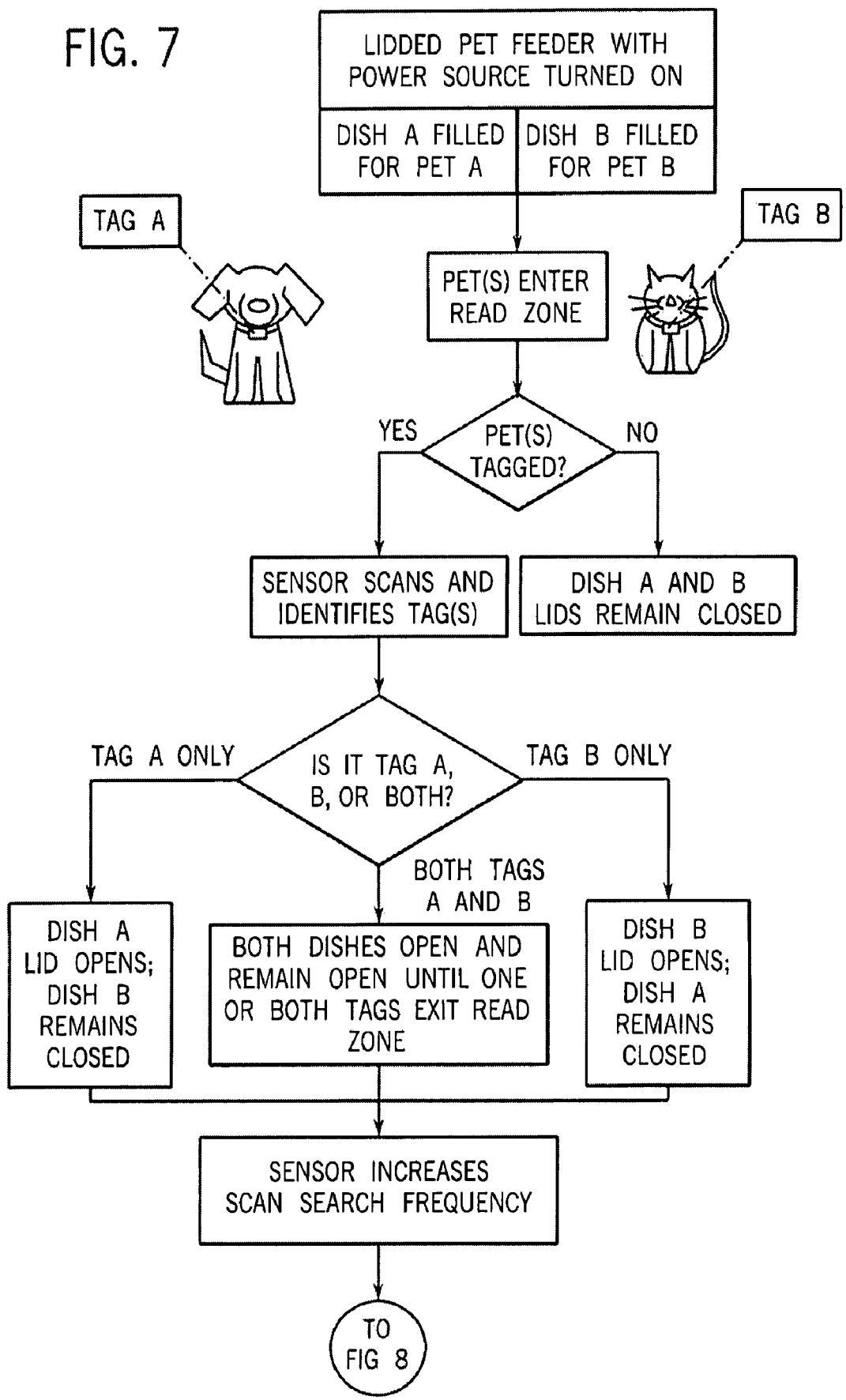
FIGS. 7 and 8 are a flow diagram illustrating the logic used in the circuitry in one embodiment of a lidded pet food dish in accordance with the present invention as used in a two pet situation.
Figure 8:
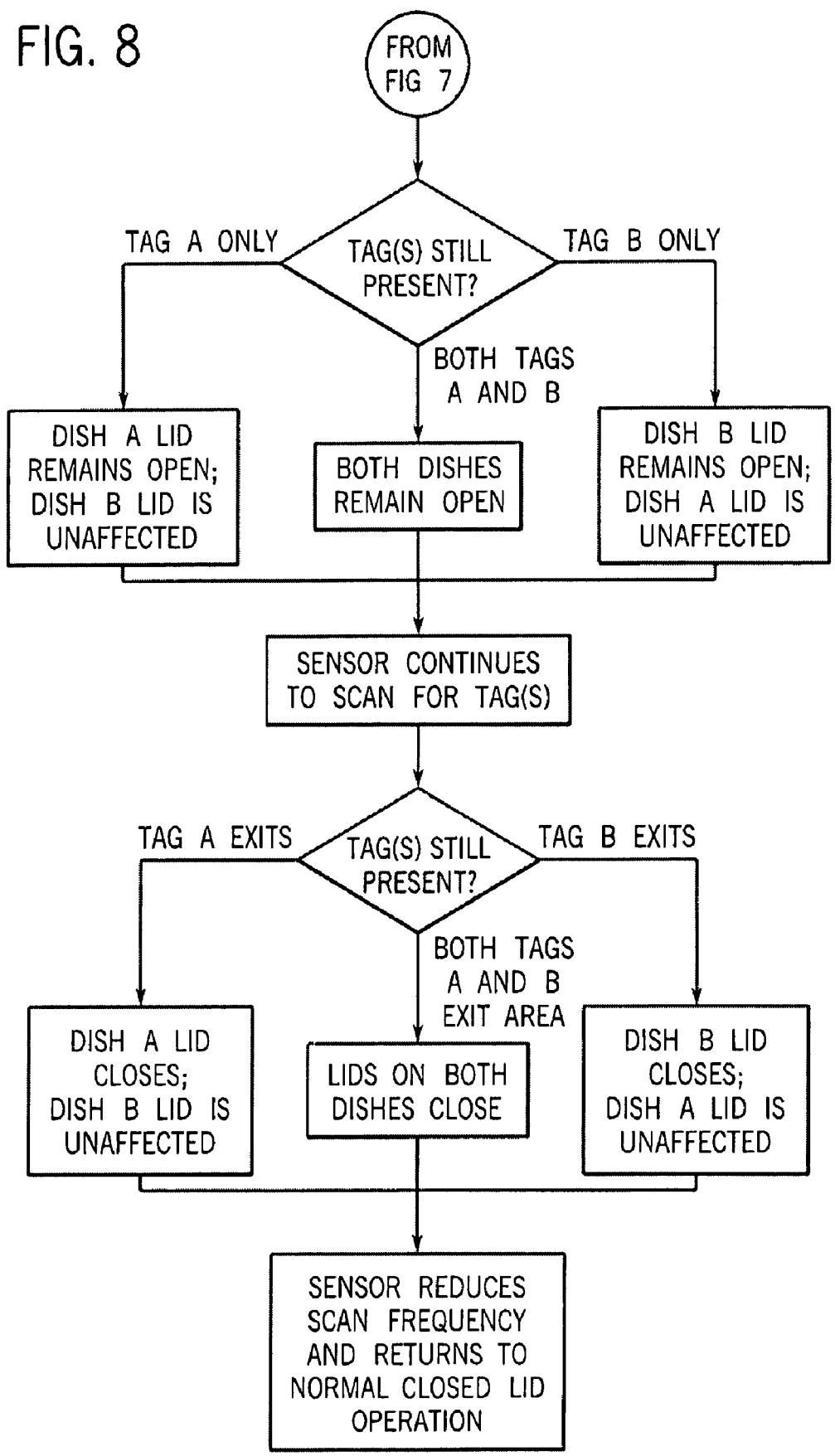

As previously alluded to, an alternative preferred embodiment would use known IR technology for actuation of the dish 10. Referring now to FIGS. 7 and 8, these figures schematically represent the logic diagram where the sensor 20 is an IR sensing device, for example. In this scenario, the sensor 20 "searches" for the tags 4, 8 at regular intervals. The IR sensor 20 is effectively and periodically checking the area near the dish 10, looking for the tags 4, 8 to appear. The lids 22, 24 will remain closed until the sensor 20 "scans" and identifies one or the other, or both, of the tags 4, 8 within a "read" zone 30. As one or both of the pets 2, 6 continues to feed, the sensor 20 will "search" for the tags 4, 8 at an increased frequency to prevent premature closing of the respective lid 22, 24. When a tag leaves the vicinity, that lid closes and the dish 10 and its sensor 20, together with its conventional circuitry (not shown), will return to "normal" searching intervals. In this scenario, the tags 4, 8 could be active or passive devices, but would preferably be active devices. That is, the tags 4, 8 would emit IR radiation that is "read" by the sensor 20 using any known IR technology modulation method.

It is also to be understood that, in the case of the use of IR technology, it may be necessary or desirable to use a separate sensor 20 for each pet tag 4, 8 and its corresponding food compartment 12, 14. The circuitry could then be presented in a series or parallel configuration as desired or required. Further, each circuit could be a stand-alone as well.

In view of the foregoing, it will be apparent that there has been provided a new, useful and non-obvious lidded pet food dish that allows selective access to the dish contents by one or more pets; that provides such a lidded pet food dish whereby multiple pets may use the dish in such a way that only the food dish compartment assigned to a particular pet is accessed by that pet, and only that pet, all others being unable to access that compartment; that provides such a lidded pet food dish that uses currently available wireless technology to accomplish this selective accessing of the lidded pet food dish; that provides such a lidded pet food dish that also includes an "override" mechanism and circuitry such that the pet owner will have unfettered access to the contents of the lidded pet food dish when such is desired or required and wherein the override mechanism and circuitry could be incorporated into a device that would be operated directly on the lidded pet food dish or remotely by the pet owner. In this fashion, the owner could check whether a given pet has eaten and, if so, how much that pet has eaten. The owner can also re-fill the dish as may be desired or required using this override mechanism or circuitry.

What is claimed is:

1. A pet dish comprising:
  at least one pet food compartment,
  a lid for covering the at least one pet food compartment,
  means for moving the lid to uncover the at least one pet food compartment,
  at least one tag worn by a pet,
  a sensor to wirelessly scan for and identify the at least one tag when the pet and tag enter a defined area about the dish, the sensor being capable of increasing and decreasing its scan frequency, and
  an electronic circuit for actuating said lid moving means when said sensor identifies said tag and for moving the lid to cover the at least one pet food compartment when the pet and tag leave the defined area,
  wherein the sensor increases its scan frequency when the lid is moved to uncover the at least one pet food compartment, and
  wherein the sensor reduces its scan frequency when the lid is moved to cover the at least one pet food compartment.

2. The pet dish of claim 1 wherein the sensor and the at least one tag are operable by wireless transmission and/or detection of radio frequency radiation.

3. The pet dish of claim 1 wherein the sensor and the at least one tag are operable by wireless transmission and/or detection of infrared radiation.

4. The pet dish of claim 3 wherein a separate sensor is provided for each tag and its corresponding food compartment.

5. The pet dish of claim 1 wherein the lid is rotatably movable about a hinge.

6. A pet dish comprising:
  two or more pet food compartments,
  a lid for covering each of the two or more pet food compartments,
  means for moving the lids to selectively and independently uncover each of the two or more pet food compartments,
  two or more tags each tag being worn by a pet,
  a sensor to wirelessly scan for and identify the two or more tags when the pets and tags enter a defined area about the dish, the sensor being capable of increasing and decreasing its scan frequency, and
  an electronic circuit for actuating said lid moving means when said sensor identifies said tags and for moving the lids to cover each pet food compartment when the pet and tag leave the defined area,
  wherein the sensor increases its scan frequency when one or both of the lids is moved to uncover a pet food compartment, and
  wherein the sensor reduces its scan frequency when one or both of the lids is moved to cover a pet food compartment.

7. The pet dish of claim 6 wherein the sensor and the two or more tags are each operable by wireless transmission and/or detection of radio frequency radiation.

8. The pet dish of claim 6 wherein the sensor and the two or more tags are each operable by wireless transmission and/or detection of infrared radiation.

9. The pet dish of claim 8 wherein a separate sensor is provided for each tag and its corresponding food compartment.

10. The pet dish of claim 6 wherein the lid is rotatably movable about a hinge.

11. A pet dish for use by a plurality of pets comprising:
  a plurality of pet food compartments,
  a lid for covering each of the pet food compartments,
  means for moving each of the lids to selectively and independently uncover each of the plurality of pet food compartments,
  a tag being worn by each of the plurality of pets,
  a sensor to wirelessly scan for and identify each tag when the pet wearing that tag enters a defined area about the dish, the sensor being capable of increasing and decreasing its scan frequency, and
  an electronic circuit for actuating said lid moving means when said sensor identifies the tag and for moving the lid to cover the corresponding pet food compartment when the pet and tag leave the defined area,
  wherein the sensor increases its scan frequency when a lid is moved to uncover one of the plurality of pet food compartments, and
  wherein the sensor reduces its scan frequency when a lid is moved to cover one of the plurality of pet food compartments.

12. The pet dish of claim 11 wherein the sensor and each tag is operable by wireless transmission and/or detection of radio frequency radiation.

13. The pet dish of claim 11 wherein the sensor and each tag is operable by wireless transmission and/or detection of infrared radiation.

14. The pet dish of claim 13 wherein a separate sensor is provided for each tag and its corresponding food compartment.

15. The pet dish of claim 11 wherein each lid is rotatably movable about a hinge.

* * * * *